W. G. BARKER.
VACUUM INSULATED VESSEL.
APPLICATION FILED NOV. 13, 1917.
1,275,830.
Patented Aug. 13, 1918.
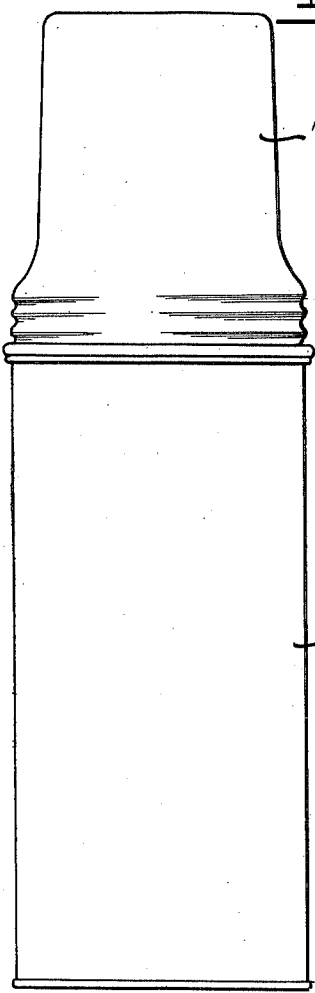
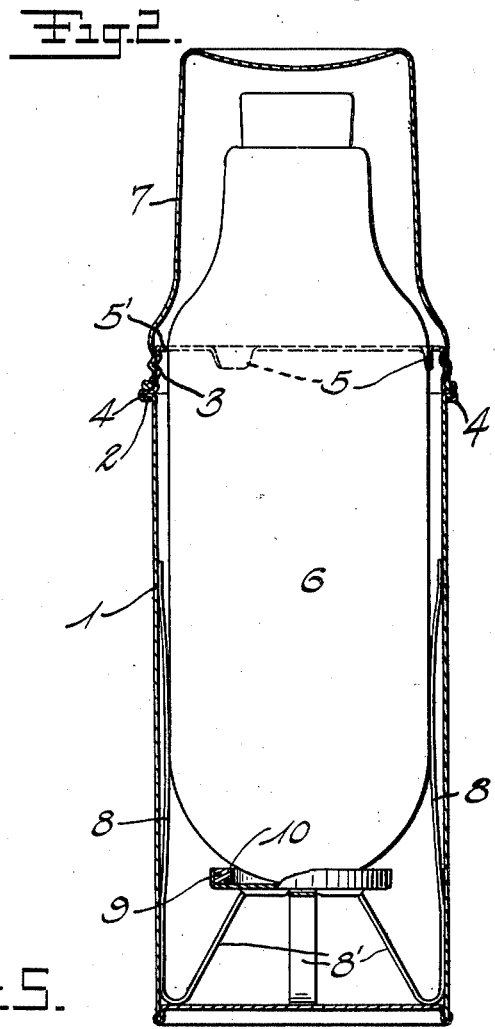
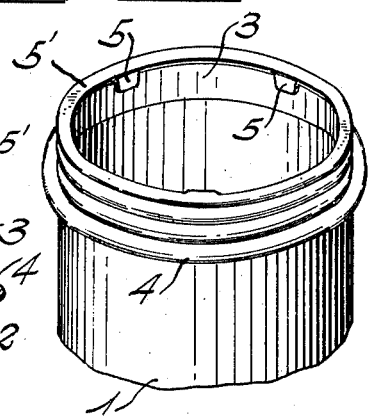
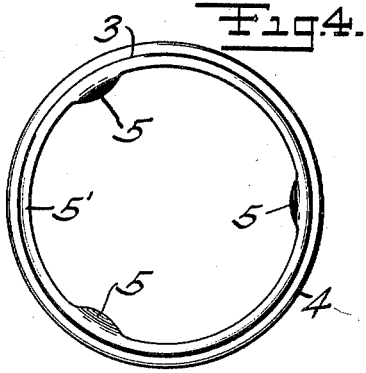
Inventor
W. G. Barker.
By his Attorneys
Bartlett & Brownell.

UNITED STATES PATENT OFFICE.

WALTER G. BARKER, OF MERIDEN, CONNECTICUT, ASSIGNOR TO MANNING BOWMAN & COMPANY, OF MERIDEN, CONNECTICUT, A CORPORATION OF CONNECTICUT.

VACUUM-INSULATED VESSEL.

1,275,830.  Specification of Letters Patent.  Patented Aug. 13, 1918.

Application filed November 13, 1917. Serial No. 201,771.

*To all whom it may concern:*

Be it known that I, WALTER G. BARKER, a citizen of the United States, residing at Meriden, county of New Haven, State of Connecticut, have invented a certain new and useful Improvement in Vacuum-Insulated Vessels, of which the following is a full, clear, and exact description.

My invention relates to improvements in vacuum vessels and has for its object to provide a vacuum vessel having a casing of a character which holds the vessel snugly in position. It further has for its object to provide a vessel having an inexpensive casing which presents a finished appearance and can be easily manufactured.

The following is a description of an embodiment of my invention, reference being had to the accompanying drawings, in which:

Figure 1 is a side elevation of an embodiment of my invention, showing the casing of the vessel, the same consisting of a body portion and a cap;

Fig. 2 is a partial vertical section of the same, the vacuum insulated container being shown in full lines within the casing, and the latter being in section;

Fig. 3 shows a detail of the top part of the body portion of the casing;

Fig. 4 shows a plan view of the same, and

Fig. 5 shows a perspective view of the same.

Referring more particularly to the drawings, the body portion of the casing consists of a cylindrical holder 1, having at its upper end a bead or flange 2 and a screw-threaded ring 3, whose lower portion 4 is spun or pressed around the flange 2, as shown more clearly in Fig. 3. The ring 3 is provided at its upper edge with downwardly turned tongues 5, which are integral with an inwardly projecting flange 5' and present lateral bearing surfaces for the vacuum insulated container 6. These tongues 5 slant inwardly slightly so that when the container 6 is placed in position they can yield slightly and thus hold the upper end of the container snugly. 7 is a cap, which is screw-threaded at its lower end so as to engage the screw-threads upon the portion 3, and is adapted to be used as a cup when removed from the body portion. The body portion contains centering springs 8, which extend upwardly adjacent to the inner wall of the casing and engage the outer wall of the lower portion of the vacuum insulated vessel at four points spaced apart by ninety (90) degrees. These springs have inwardly and upwardly extending portions 8' to which is secured a holder 9, containing a cork ring 10 on which the bottom of the vacuum insulated container 6 seats, as shown in Fig. 2.

The screw-threaded portion 3 of the casing is formed separately from the lower portion and its lower end is then spun around the flange or bead 2 so as to be held firmly in position.

The casing thus formed holds the vessel firmly and yet protects it to some extent against shocks, and presents a finished appearance, the flange 5' covering the space between the vessel and the vertical wall of the casing.

As will be evident to those skilled in the art, my invention permits of various modifications, without departing from the spirit thereof or the scope of the appended claims.

What I claim is:

1. A vacuum insulated vessel comprising a container, a vertical-walled casing therefor composed of a bottom portion, and a separately formed top ring secured thereto, said ring having at its upper end a plurality of downwardly extending projections engaging the outer surface of the vessel and spacing said vessel away from the vertical wall of said casing.

2. A vacuum insulated vessel comprising a container, a vertical-walled casing therefor composed of a bottom portion, and a separately formed screw-threaded top ring secured thereto, said ring having at its upper end an internal flange and downward projecting means engaging the outer surface of the vessel and spacing said vessel away from the vertical wall of said casing.

3. A vacuum insulated vessel comprising a container, a vertical-walled casing therefor composed of a bottom portion, and a separately formed screw-threaded top ring secured thereto, said ring having at its upper end an internal flange and a plurality of downwardly and inwardly projecting projections engaging the outer surface of the vessel and spacing said vessel away from the vertical wall of said casing.

WALTER G. BARKER.